(12) United States Patent
Orozco et al.

(10) Patent No.: US 12,001,307 B2
(45) Date of Patent: Jun. 4, 2024

(54) SYSTEMS AND METHODS FOR MONITORING SOFTWARE SERVICES

(71) Applicant: Palantir Technologies Inc., Denver, CO (US)

(72) Inventors: Andres Felipe Orozco, New York, NY (US); Robert Kruszewski, London (GB); Thomas Petracca, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 17/848,708

(22) Filed: Jun. 24, 2022

(65) Prior Publication Data

US 2022/0413977 A1 Dec. 29, 2022

Related U.S. Application Data

(60) Provisional application No. 63/214,895, filed on Jun. 25, 2021.

(51) Int. Cl.
*G06F 11/30* (2006.01)
*G06F 8/70* (2018.01)
*G06F 11/34* (2006.01)

(52) U.S. Cl.
CPC .............. *G06F 11/302* (2013.01); *G06F 8/70* (2013.01); *G06F 11/3447* (2013.01)

(58) Field of Classification Search
CPC ....... G06F 11/302; G06F 11/3347; G06F 8/70
USPC ................................................. 717/120–140
See application file for complete search history.

(56) References Cited

U.S. PATENT DOCUMENTS

| 6,021,437 | A | * | 2/2000 | Chen | G06F 11/327 709/227 |
| 6,141,699 | A | * | 10/2000 | Luzzi | G06F 11/3495 719/331 |
| 7,317,394 | B2 | * | 1/2008 | Koh | G06F 8/10 340/572.1 |
| 7,379,999 | B1 | * | 5/2008 | Zhou | G06F 11/3476 709/224 |
| 7,523,191 | B1 | * | 4/2009 | Thomas | G06F 11/3476 709/224 |

(Continued)

FOREIGN PATENT DOCUMENTS

EP 4123462 A2 1/2023

OTHER PUBLICATIONS

Robinson, "Monitoring Web Service Requirements", IEEE, pp. 1-10 (Year: 2011).*

(Continued)

*Primary Examiner* — Anil Khatri
(74) *Attorney, Agent, or Firm* — Faegre Drinker Biddle & Reath LLP

(57) ABSTRACT

A computer-implemented method for generating a monitor for at least one software service from a monitor template, includes, in at least some aspects: providing a monitor template. Further, in certain instances, the method includes determining one or more endpoints included in code for a first software service of the at least one software service. In addition, in some aspects, the method includes generating a first monitor for the first software service code using the monitor template based at least upon a first endpoint of the one or more endpoints included in the first software service code.

40 Claims, 5 Drawing Sheets

(56) References Cited

U.S. PATENT DOCUMENTS

| | | | |
|---|---|---|---|
| 7,622,671 B2* | 11/2009 | Yamamoto | B60R 16/0215 |
| | | | 439/573 |
| 8,271,964 B2* | 9/2012 | Zorn | G06F 8/20 |
| | | | 717/151 |
| 8,689,181 B2* | 4/2014 | Biron, III | H04L 67/10 |
| | | | 717/115 |
| 8,694,969 B2* | 4/2014 | Bernardini | G06F 11/3612 |
| | | | 717/124 |
| 10,237,149 B1* | 3/2019 | Guo | H04L 43/04 |
| 10,305,758 B1* | 5/2019 | Bhide | G06F 11/3409 |
| 10,560,353 B1* | 2/2020 | Stickle | H04L 47/70 |
| 10,765,990 B2* | 9/2020 | Meirav | B01D 53/0462 |
| 10,985,970 B1 | 4/2021 | Goyal et al. | |
| 11,188,437 B1* | 11/2021 | Arunachalam | G06F 9/4806 |
| 11,295,274 B1* | 4/2022 | Ghasem Khan Ghajar | |
| | | | G06F 9/547 |
| 2005/0138111 A1 | 6/2005 | Aton et al. | |
| 2014/0280398 A1* | 9/2014 | Smith | H04L 69/326 |
| | | | 707/825 |
| 2016/0170743 A1* | 6/2016 | Shmulevich | G06F 16/252 |
| | | | 717/120 |
| 2020/0257680 A1 | 8/2020 | Danyi et al. | |

OTHER PUBLICATIONS

Chen et al, "A Framework-based Runtime Monitoring Approach for Service-Oriented Software Systems", ACM, pp. 17-20 (Year: 2011).*
Cohen et al, "Automatic Monitoring of Software Requirements", ACM, pp. 602-603 (Year: 1997).*
Bratanis et al, "An Extensible Architecture for Run-time Monitoring of Conversational Web Services", ACM, pp. 9-16 (Year: 2010).*
Pasic, "Model-Driven Development of Condition Monitoring Software", ACM, pp. 1-6 (Year: 2018).*
Lokawati et al, "Monitoring System of Multi-Tenant Software as a Service (SaaS)", IEEE, pp. 1-5 (Year: 2019).*

* cited by examiner

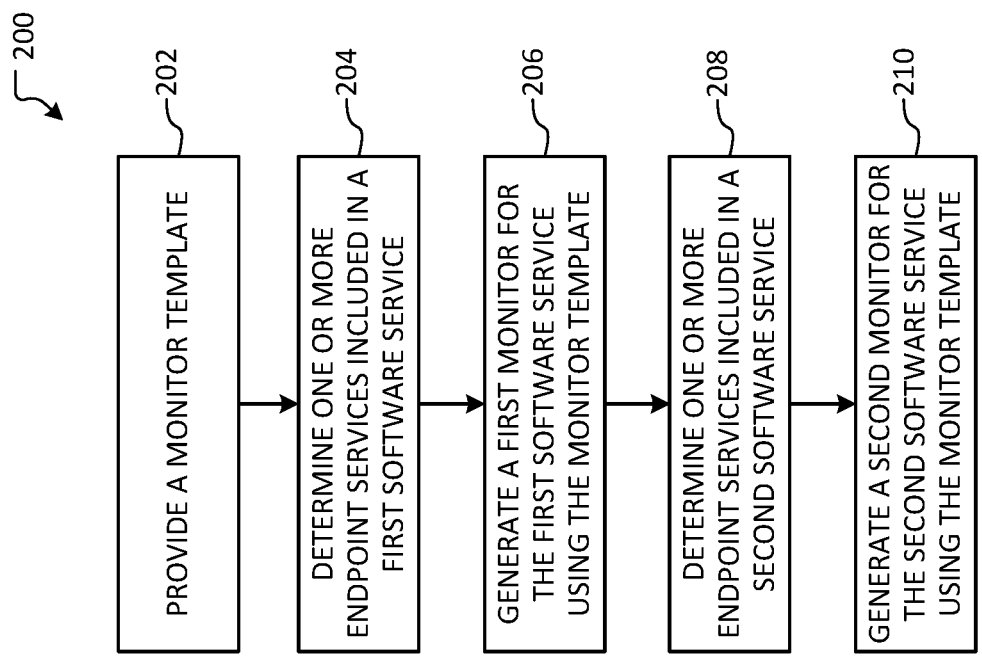

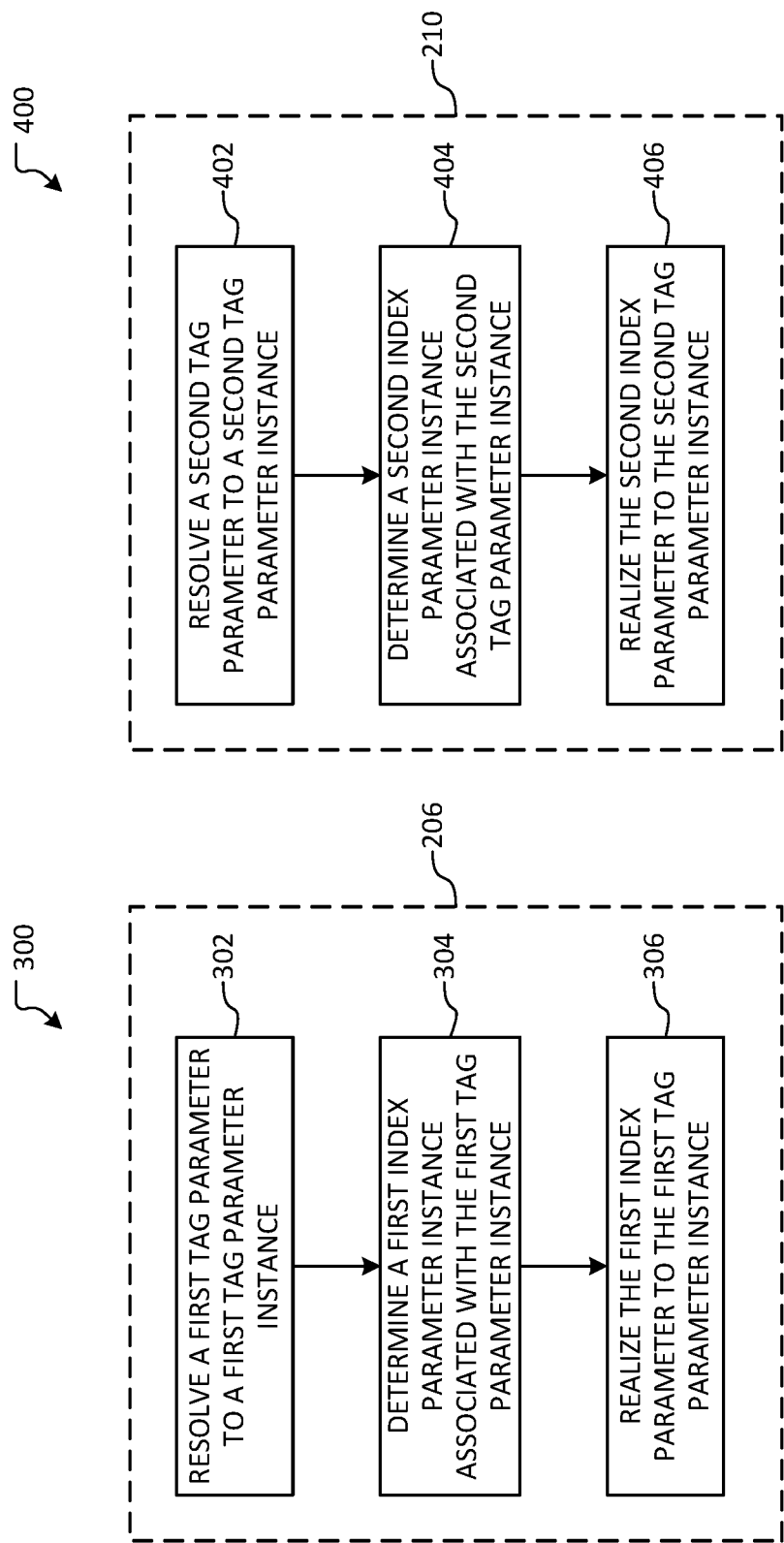

SYSTEMS AND METHODS FOR MONITORING SOFTWARE SERVICES

CROSS REFERENCE TO RELATED APPLICATIONS

This application claims priority to U.S. Provisional Application No. 63/214,895, filed Jun. 25, 2021, incorporated by reference herein for all purposes.

BACKGROUND

Certain embodiments of the present disclosure are directed to monitoring software services. More specifically, certain embodiments of the present disclosure are directed to systems and methods for deploying one or more monitor templates to monitor software services.

Various software services include software monitors to determine whether a software service is operating correctly. In conventional embodiments, the software monitors are hard coded, meaning specific definitions and thresholds are coded for each monitor. Hard-coding software monitors, however, leads to a lot of coding, manual inspection of the software service and the software monitor, and time-consuming updates.

Hence it is highly desirable to improve techniques for creating software monitors that can reduce and/or eliminate the need to hard-code a software monitor.

SUMMARY

In certain implementations, a system and a method for generating a monitor for at least one software service from a monitor template are provided. In some examples, a method includes providing a monitor template. In some examples, the method includes determining one or more endpoints included in code for a first software service of the at least one software service. Further, in some examples, the method includes generating a first monitor for the first software service code using the monitor template based at least upon a first endpoint of the one or more endpoints included in the first software service code.

In some implementations, a system and a method for generating a monitor for at least one software service from a monitor template are provided. In some examples, a method includes providing a monitor template comprising a schema for a tag parameter and an index parameter. In some examples, the method includes determining one or more endpoints included in code for a first software service of the at least one software service. In some examples, the method includes resolving the tag parameter to a tag parameter instance associated with the software service. In some examples, the method includes determining an index parameter instance that is associated with the tag parameter instance, and realizing the index parameter to the tag parameter instance.

In certain implementations, a system and a method for monitoring at least one software service using a monitor template are provided. In some examples, a method includes monitoring a first software service of the at least one software service using a first monitor generated by the monitor template. In some examples, the monitoring the first software service using the first monitor includes using a first resolved tag parameter and a first realized index parameter of the first monitor. In some examples, the method includes detecting, by the first monitor, whether a first aberration of the first software service has occurred. In some examples, the method includes determining a first event corresponding to the first aberration. In some examples, the method includes performing the first event in response to the occurrence of the first aberration.

In certain implementations, a system and a method for monitoring at least one software service using a monitor template are provided. In some examples, a method includes generating a first monitor using the monitor template for a first software service. In some examples, the method includes monitoring the first software service using a first monitor generated by the monitor template. In some examples, the monitoring the first software service using the first monitor includes using a first resolved tag parameter and a first realized index parameter of the first monitor. In some examples, the method includes detecting, by the first monitor, whether a first aberration of the first software service has occurred. In some examples, the method includes determining a first event corresponding to the first aberration, and includes performing the first event in response to the occurrence of the first aberration.

Depending upon the embodiment, one or more benefits may be achieved. These benefits and various additional benefits can be fully appreciated with reference to the detailed description and accompanying drawings that follow.

BRIEF DESCRIPTION OF THE DRAWINGS

FIG. 2 is a flow diagram illustrating a method for generating a monitor for at least one software service from a monitor template in accordance with at least one example set forth in the disclosure;

FIGS. 3 and 4 are flow diagrams illustrating methods for resolving a tag parameter to a tag parameter instance and realizing an index parameter to an index parameter instance when generating a monitor template in accordance with at least one example set forth in the disclosure;

DETAILED DESCRIPTION

The embodiments disclosed herein provide one or more solutions that overcome one or more problems specifically arising in the realm of computer technology. For example, as set forth above, hard-coding software monitors leads to a lot of coding, manual inspection of the software service and the software monitor, and time-consuming updates. Embodiments of the present disclosure solve this problem by deploying a monitor template. For example, during deployment of a software service, the monitor template automatically generates and deploys a monitor to monitor the software service without having to hardcode a specific monitor for the software service. Instead, for example, the monitor template includes a plurality of schema for one or more tag parameters and one or more index parameters corresponding to the one or more tag parameters. In certain aspects, a computer-implemented method resolves a tag parameter to a tag parameter instance, determines an index parameter instance associated with the tag parameter instance, and realizes an index parameter of the one or more index parameters to the index parameter instance. In some aspects, once the monitor template has identified the resolved tag parameter to the tag parameters instance and realized the index parameter to the index parameter instance, the instances are monitored to determine any aberrations. When there is an aberration, an event is triggered according to at least some aspects of the present disclosure. In some instances, code can be executed in response to the event, such as sending an alert, initiating a post in Slack, opening a Jira ticket, and/or the like.

Due to the monitor templates, any number of software services can be monitored without having to individually code specific monitors for each of the software services. Instead, for example, the monitor template is developed so that the monitor template can be resolved using tag parameters and index parameters to each of the software services so no change in the monitor template code is required. As such, the embodiments disclosed herein provide one or more solutions that overcome one or more problems specifically arising in the realm of computer technology.

Figure 1:
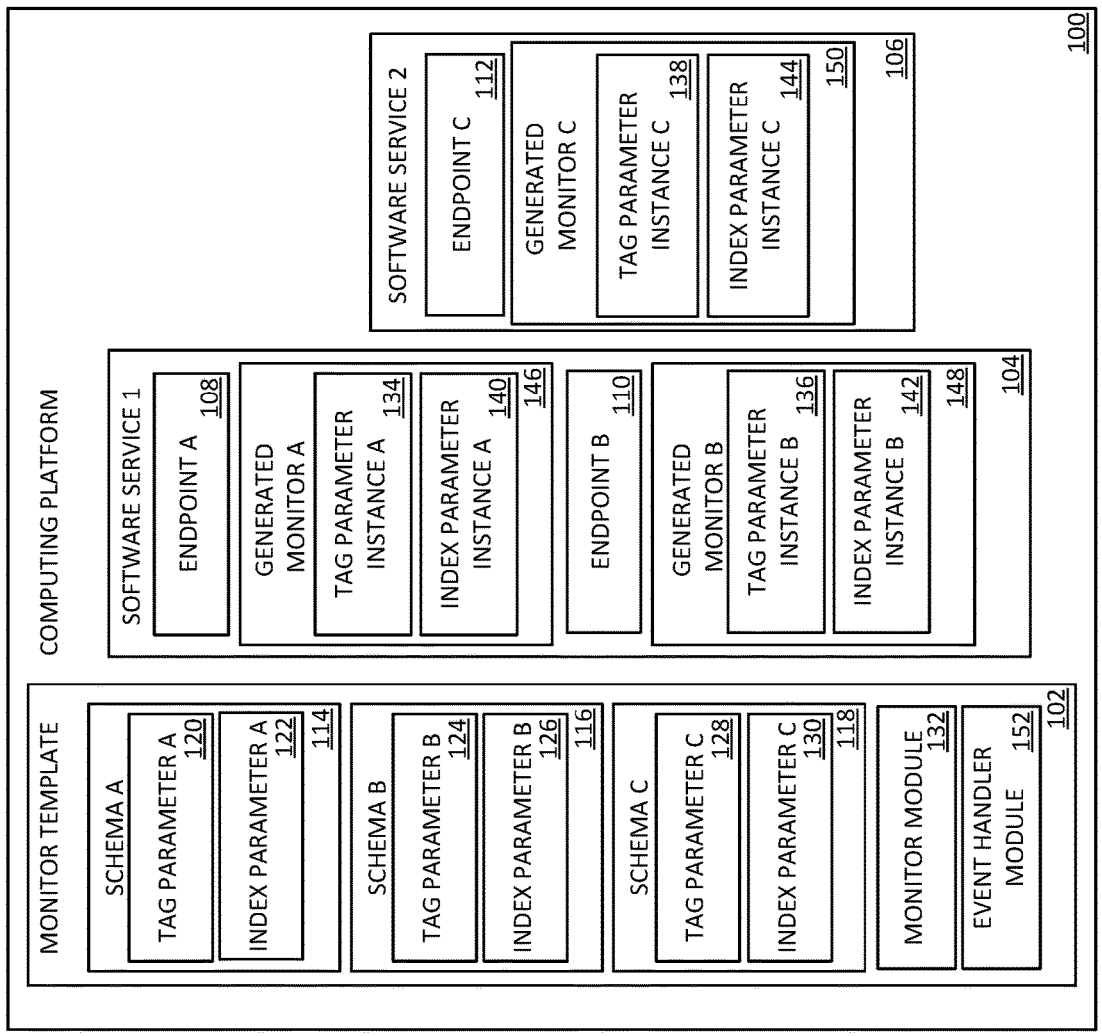
FIG. 1 is a block diagram illustrating a system for generating a monitor for at least one software service from a monitor template in accordance with at least one example set forth in the disclosure.

FIG. 1 is a block diagram illustrating a computing platform 100 for generating a monitor using a monitor template 102 for one or more of the software service 104 and/or the software service 106 in accordance with at least one example set forth in the disclosure. This diagram is merely an example, which should not unduly limit the scope of the claims. One of ordinary skill in the art would recognize many variations, alternatives, and modifications.

In certain embodiments, the computing platform 100 is a server, a desktop computer, a mobile device, and/or other computing device. In at least some examples, the computing platform 100 includes one or more software services 104, 106 installed on and/or instantiated on the computing platform 100. In certain instances, one or more of the software service 104 and/or the software service 106 include any type of software service. Examples of software services 104, 106 include, but are not limited to, web applications, e-commerce applications, content creation applications, content management applications, and/or the like.

In some examples, each software service 104, 106 includes one or more endpoints 108, 110, 112. For example, the first software service 104 includes endpoints 108, 110 and the second software service 106 includes endpoint 112.

In certain embodiments, a user interacts with one or more of the endpoint 108, the endpoint 110, and/or the endpoint 112. In at least one example, a user calls upon one or more of the endpoint 108, the endpoint 110, and/or the endpoint 112 by, for example, providing an input to one or more of the endpoint 108, the endpoint 110, and/or the endpoint 112. Then, in at least some embodiments, one or more of the endpoint 108, the endpoint 110, and/or the endpoint 112 performs a process and outputs to the user a response to the call. According to certain embodiments, the response by one or more of the endpoint 108, the endpoint 110, and/or the endpoint 112 should be provided in a threshold amount of time, which the monitor template monitors, as explained in more detail below.

In certain instances, the monitor template 102 is installed on and/or instantiated on the computing platform 100. In at least some aspects, the monitor template is embedded within the code of one or more of the software service 104 and/or the software service 106. While only one monitor template 102 is illustrated, the computing platform can include a plurality of monitor templates 102. In certain aspects, the monitor template 102 is descriptive of its purpose or use case, rather than being a direct query one would form in a third-party system. In this way, according to certain embodiments, the monitor template 102 can be used to monitor any number of arbitrary third-party timeseries databases, such as DataDog or Prometheus. Further, according to certain embodiments, switching from one third-party database to another requires little or no changes to the monitor template 102.

In certain instances, the monitor template 102 includes one or more schema 114, 116, 118. In some examples, each schema 114, 116, 118 includes one or more tag parameters 120, 124, 128 and one or more index parameters 122, 126, 128. For example, the schema A 114 includes tag parameter A 120 and index parameter A 122; schema B includes tag parameter B 124 and index parameter B 126; schema C includes tag parameter C 128 and index parameter C 130. In instances, one or more of the tag parameters 120, 124, 128 are a named set of string tuples and one or more of the tag parameters 120, 124, 128 are double values.

According to certain embodiments, one or more of the schema 114, the schema 116, and/or the schema 118 and their corresponding tag parameters 120, 124, and/or 128 and index parameters 122, 126, and/or 130 are used to monitor one or more of the software service 104 and/or the software service 106. For example, the monitor template 102 is stored in the same code repository as one or more of the software service 104 and/or the software service 106 that the monitor template 102 monitors. Further, in certain embodiments, each of the tag parameters 120, 124, 128 correspond to potential identifiers of endpoints 108, 110, 112 included in one or more of the software service 104 and/or the software service 106. Then, when one or more of the software service 104 and/or the software service 106 is deployed (e.g., via Apollo), one or more of the tag parameters 120, 124, 128 are resolved based on the identifiers included in one or more of the software service 104 and/or the software service 106.

For example, in certain instances, the monitor template 102 includes a monitor module 132 that queries the code included in one or more of the software service 104 and/or the software service 106 to determine one or more identifiers associated with one or more endpoints 108, 110, 112 included in the code. In aspects, the monitor module 132 then matches one or more of the tag parameters 120, 124, 128 to a corresponding endpoint 108, 110, 112 based upon one or more identifiers included in the one or more software services 104, 106. For the tag parameters 120, 124, 128 that are matched to one or more endpoints 108, 110, 112, the monitor module 132 resolves each of the matched tag parameters 120, 124, 128 to a respective tag parameter instance 134, 136, 138.

Additionally, in certain embodiments, the monitor module 132 performs a look-up for each of the identifiers associated with an endpoint 108, 110, 112 to determine thresholds (e.g., response times) associated with each of the identifiers and, by association, the endpoints 108, 110, 112. Based on each of the thresholds, the monitor module 132 realizes each of the index parameters 122, 126, 130 associated with each of the tag parameters 120, 124, 128 to an index parameter instance 140, 142, 144. That is, for example, each of the index parameter instances 140, 142, 144 are functions that transform each of their respective tag parameter instances 134, 136, 138 to a threshold based on the look-up. In this manner, according to certain aspects, the monitor module 132 generated one or more of the monitor 146, the monitor 148, and/or the monitor 150 associated with respective endpoints 108, 110, 112.

For example, in the illustrated embodiment, the first software service 104 includes endpoint A 108 and endpoint B 110. In this example, the monitor module 132 queries the code of the first software service 104 to determine one or more identifiers associated with one or more of the endpoint 108 and/or the endpoint 110. In certain embodiments, the monitor module 132 also performs a lookup of a threshold for each of the endpoints 108, 110. In some aspects, the monitor module 132 then matches each of the identifiers associated with the endpoints 108, 110 to a schema 114, 116, 118 and, particularly, to a tag parameter 120, 124, 128 of a schema 114, 116, 118. After which, in certain embodiments, the monitor module 132 resolves a tag parameter 120, 124, 128 to its matched endpoint 108, 110 to generate tag parameter instances 134, 136. For example, the monitor module 132 generates the tag parameter instance 134 for the endpoint 108 and generates the tag parameter instance 136 for the endpoint 110.

Further, in certain embodiments, the monitor module 132 realizes an index parameter 122, 126, 130 as index parameters instances 140, 142 based upon (i) the thresholds that were found using the lookup and (ii) which schemas 114, 116, 118 were matched to the endpoints 108, 110.

For example, if the tag parameter 120 of schema 114 was matched to endpoint A 108 and a threshold A is associated with endpoint A 108 based upon the lookup, then the monitor module 132 realizes the index parameter A 122 as index parameter instance A 140 using the threshold A. Stated another way, in certain embodiments, if the endpoint A 108 exceeds threshold A, then index parameter instance A 140 is triggered and an event occurs, as discussed in more detail below. Each pair of tag parameter instances 134, 136, 138 and index parameter instances 140, 142, 144 are generated monitors 146, 148, 150 for different endpoints 108, 110, 112.

As another example, if the tag parameter 124 of schema 116 was matched to endpoint B 110 and a threshold B is associated with endpoint B 220 based upon the lookup, then the monitor module 132 realizes the index parameter B 124 as index parameter instance B 142 using the threshold B. That is, in certain embodiments, if the endpoint B 110 exceeds threshold B, then index parameter instance B 142 is triggered and an event occurs, as discussed in more detail below.

As another example, in the illustrated embodiment, the second software service 106 includes endpoint C 112. In this example, the monitor module 132 queries the code of the second software service 106 to determine one or more identifiers associated with the endpoint C 112. In certain embodiments, the monitor module 132 also performs a lookup of a threshold for each of the endpoint C 112. In some aspects, the monitor module 132 then matches the identifier associated with the endpoint 112 to a schema 114, 116, 118 and, particularly, to a tag parameter 120, 124, 128 of a schema 114, 116, 118. After which, in certain embodiments, the monitor module 132 resolves a tag parameter 120, 124, 128 to its matched endpoint C 112 to generate a tag parameter instance 138 for the endpoint C 112.

Similar to the embodiments described above, in certain embodiments, the monitor module 132 realizes an index parameter 122, 126, 130 as an index parameters instance 144 based upon (i) the threshold that was found using the lookup and (ii) which schemas 114, 116, 118 were matched to the endpoint 112. For example, if the tag parameter 128 of schema 118 was matched to endpoint C 112 and a threshold C is associated with endpoint C 112 based upon the lookup, then the monitor module 132 realizes the index parameter C 130 as index parameter instance C 144 using the threshold C. Stated another way, if the endpoint C 112 exceeds threshold C, then index parameter instance C 144 is triggered and an event occurs, as discussed in more detail below.

Each pair of tag parameter instances 134, 136, 138 and index parameter instances 140, 142, 144 may be referred to herein as generated monitors 146, 148, 150 for different endpoints 108, 110, 112.

In view of the embodiments described above, deploying one or more of the software service 104 and/or the software service 106 results in one or more of the software service 104 and/or the software service 106 being monitored by the monitor template 102.

According to certain embodiments, the monitor template 102 includes an event handler module 152. In certain aspects, the event handler module 152 performs a process when an index parameter instance 140, 142, 144 is triggered, i.e., an endpoint 108, 110, 112 exceeds a threshold that was found during the lookup. While the event handler module 152 is depicted as being included in the monitor template 102, in other instances, the event handler module 152 may not be included in the monitor template 102.

In at least some embodiments, one or more of the generated monitor 146, the generated monitor 148, and/or the generated monitor 150 monitor their respective endpoints 108, 110, 112. In certain aspects when one or more of the generated monitor 146, the generated monitor 148, and/or the generated monitor 150 determine the threshold associated with one or more of the index parameter instance 140, the index parameter instance 142, and/or the index parameter instance 144 are met or exceeded, one or more of the generated monitor 146, the generated monitor 148, and/or the generated monitor 150 determine an aberration associated with an endpoint 108, 110, 112 has occurred. In at least some examples, one or more of the generated monitor 146, the generated monitor 148, and/or the generated monitor 150 send a signal to the event handler module 152 in response to determine the aberration. In response, the event handler module 152 determines a first event to perform in response to the aberration and then performs the first event.

For example, if generated monitor A 146 detects endpoint A 108 has exceeded a threshold associated with index parameter instance A 140, then generated monitor A 146 determines an aberration has occurred with endpoint A 108. In response, according to at least some embodiments, generated monitor A 146 sends a signal to event handler module 152. Event handler module 152 then determines a first event to perform in response to the aberration associated with endpoint A 108 and performs the first event. As another example, if generated monitor B 148 detects endpoint B 110 has exceeded a threshold associated with index parameter instance B 142, then generated monitor B 148 determines an aberration has occurred with endpoint B 110. In response, according to at least some embodiments, generated monitor B 148 sends a signal to event handler module 152. Event handler module 152 then determines a second event to perform in response to the aberration associated with endpoint B 110 and performs the second event. As even another example, if generated monitor C 150 detects endpoint C 112 has exceeded a threshold associated with index parameter instance C 144, then generated monitor C 150 determines an aberration has occurred with endpoint C 112. In response, according to at least some embodiments, generated monitor C 150 sends a signal to event handler module 152. Event handler module 152 then determines a third event to perform in response to the aberration associated with endpoint C 112 and performs the third event. According to certain embodiments, the first event, the second event, and/or the third event can include, but are not limited to, sending an alert, sending a message (e.g., a Slack message), and/or initiating a help ticket (e.g., Jira ticket).

According to certain embodiments, the event that is performed in response to the aberration can be user-defined. For example, the event handler module 152 can include a default event to perform in response to receiving a signal from one or more of the generated monitor 146, the generated monitor 148, and/or the generated monitor 150 that an aberration has occurred with one or more of the endpoint 108, the endpoint 110, and/or the endpoint 112. In certain aspects, the event handler module 152 performs the default event in response to the signal. However, in certain embodiments, a user can change the default event to another user-defined event. In response to the user changing the default event to another user-defined event, the event handler module 152 performs the user-defined event instead of the default event in response to the signal received from one or more of the generated monitor 146, the generated monitor 148, and/or the generated monitor 150.

FIG. 2 is a flow diagram illustrating a method 200 for generating a monitor for at least one software service from a monitor template in accordance with at least one example set forth in the disclosure. This diagram is merely an example, which should not unduly limit the scope of the claims. One of ordinary skill in the art would recognize many variations, alternatives, and modifications. The method 200 although being shown using a selected group of processes, there can be many alternatives, modifications and variations. For example, some of the processes may be expanded and/or combined. Other processes may be inserted to those noted above. Depending upon the embodiment, the sequence of processes may be interchanged with others replaced, or the sequence altered.

In some embodiments, some or all processes (e.g., steps) of the method 200 are performed by the computing platform 100. In certain examples, some or all processes (e.g., steps) of the method 200 are performed by a computer and/or a processor directed by a code. For example, a computer includes a server computer and/or a client computer (e.g., a personal computer). In some examples, some or all processes (e.g., steps) of the method 200 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

In some examples, the method 200 includes providing a monitor template (block 202). According to certain embodiments, the monitor template is the same as or similar to the monitor template 102. For example, the monitor template can be embedded within code of a software service and/or include a plurality of schema (e.g., schema 114, 116, 118), such that each schema includes one or more tag parameters (e.g., tag parameter 120, 124, 128) and one or more index parameters (122, 126, 130). Further, in certain embodiments, the monitor template can include a monitor module 132 and/or an event handler module 152.

In certain aspects, the method 200 includes determining one or more endpoint services included in a first software service (block 204). To do so, in certain aspects, the method 200 queries the code of the first software service to determine one or more identifiers associated with endpoints included in the code of the first software service. In certain embodiments, the endpoints include a first endpoint. In certain embodiments, the method generates a first monitor for the first software service using the monitor template based upon at least the first endpoint identified during the query (block 206). In certain aspects, generating the first monitor can be performed as described in method 300 of FIG. 3.

Additionally, or alternatively, the method 200 further includes determining one or more endpoint services included in a second software service (block 208). To do so, in certain aspects, the method 200 queries the code of the second software service to determine one or more identifiers associated with endpoints included in the code of the second software service. In certain embodiments, the endpoints include a second endpoint. In certain embodiments, the method generates a second monitor for the second software service using the monitor template based upon at least the second endpoint identified during the query (block 210). In certain aspects, generating the second monitor can be performed as described in method 400 of FIG. 4.

FIGS. 3 and 4 are flow diagrams illustrating methods 300, 400 for resolving a tag parameter to a tag parameter instance and realizing an index parameter to an index parameter instance when generating a monitor template in accordance with at least one example set forth in the disclosure. These diagrams are merely examples, which should not unduly limit the scope of the claims. One of ordinary skill in the art would recognize many variations, alternatives, and modifications. The methods 300, 400 although being shown using a selected group of processes, there can be many alternatives, modifications and variations. For example, some of the processes may be expanded and/or combined. Other processes may be inserted to those noted above. Depending upon the embodiment, the sequence of processes may be interchanged with others replaced, or the sequence altered.

In some embodiments, some or all processes (e.g., steps) of the methods 300, 400 are performed by the computing platform 100. In certain examples, some or all processes (e.g., steps) of the methods 300, 400 are performed by a computer and/or a processor directed by a code. For example, a computer includes a server computer and/or a client computer (e.g., a personal computer). In some examples, some or all processes (e.g., steps) of the methods 300, 400 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

As stated above, method 300 can be performed as part of the process of generating a first monitor template (block 206) of method 200. In certain aspects, method 300 includes resolving a first tag parameter to a first tag parameter instance (block 302). In aspects, the first tag parameter can be a string tuple. The first tag parameter can be the same or similar as one or more of the tag parameters 120, 124, 128 illustrated in FIG. 1. Similarly, the first tag parameter instance can be the same or similar as one or more of the tag parameter instances 134, 136, 138. For example, in aspects to resolve a first tag parameter to a first tag parameter instance, the method 300 includes matching one or more of the tag parameters to a corresponding endpoint based upon one or more identifiers included in the one or more software services. For the tag parameters that are matched to one or more endpoints, the method 300 resolves each of the matched tag parameters to a tag parameter instance.

In certain instances, the method 300 includes determining a first index parameter instance associated with the first tag parameter instance (block 304). To do so, in certain instances, the method 300 performs a look-up for each of the identifiers associated with an endpoint to determine thresholds (e.g., response times) associated with each of the identifiers and, by association, the endpoints. Based on each of the thresholds, in some examples, the method 300 realizes each of the index parameters associated with each of the tag parameters in a schema to a first index parameter instance (block 306). That is, for example, the index parameter instances are functions that transform each of their respective tag parameter instances to a threshold based on the look-up. In this manner, according to certain aspects, the method 300 generates monitors associated with respective endpoints. In aspects, the first index parameter can be a double value.

In certain aspects, a similar method 400 as the method 300 can be performed to generate the second monitor. That is, for example, method 400 includes resolving a second tag parameter to a second tag parameter instance (block 402). In aspects, the second tag parameter can be a string tuple. The second tag parameter can be the same or similar as one or more of the tag parameters 120, 124, 128 illustrated in FIG. 1. Similarly, the second tag parameter instance can be the same or similar as one or more of the tag parameter instances 134, 136, 138. For example, in aspects to resolve a second tag parameter to a second tag parameter instance, the method 400 includes matching one or more of the tag parameters to a corresponding endpoint based upon one or more identifiers included in the one or more software services. For the tag parameters that are matched to one or more endpoints, the method 400 resolves each of the matched tag parameters to a tag parameter instance.

In certain instances, the method 400 includes determining a second index parameter instance associated with the second tag parameter instance (block 404). To do so, in certain instances, the method 400 performs a look-up for each of the identifiers associated with an endpoint to determine thresholds (e.g., response times) associated with each of the identifiers and, by association, the endpoints. Based on each of the thresholds, in some examples, the method 400 realizes each of the index parameters associated with each of the tag parameters in a schema to a second index parameter instance (block 306). In aspects, the second index parameter can be a double value.

Figure 5:
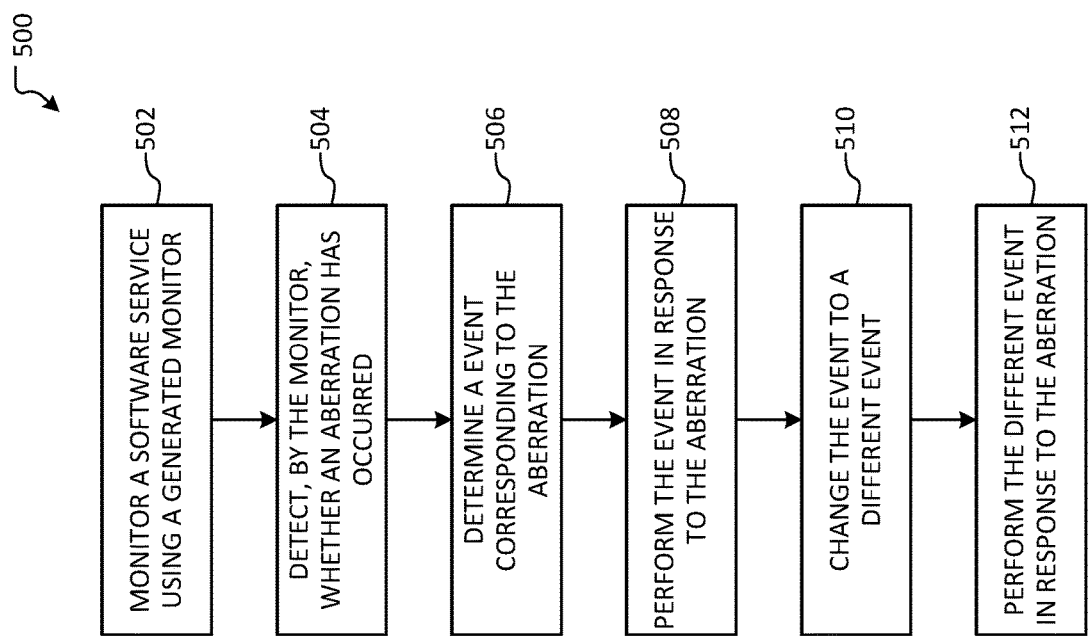
FIG. 5 is flow diagram illustrating a method for monitoring at least one software service using a monitor template in accordance with at least one example set forth in the disclosure.

FIG. 5 is a flow diagram of a method 500 for monitoring at least one software service using a monitor template in accordance with at least one example set forth in the disclosure. This diagram is merely an example, which should not unduly limit the scope of the claims. One of ordinary skill in the art would recognize many variations, alternatives, and modifications. The method 500 although being shown using a selected group of processes, there can be many alternatives, modifications and variations. For example, some of the processes may be expanded and/or combined. Other processes may be inserted to those noted above. Depending upon the embodiment, the sequence of processes may be interchanged with others replaced, or the sequence altered.

In some embodiments, some or all processes (e.g., steps) of the method 500 are performed by the computing platform 100. In certain examples, some or all processes (e.g., steps) of the method 500 are performed by a computer and/or a processor directed by a code. For example, a computer includes a server computer and/or a client computer (e.g., a personal computer). In some examples, some or all processes (e.g., steps) of the method 500 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to certain aspects, the method 500 includes monitoring a software service using a monitor template (block 502). In aspects, the generated monitor is the same as or similar to one or more of the generated monitor 146, the generated monitor 148, and/or the generated monitor 150. For example, the generated monitor is generated from a monitor template that is the same as or similar to the monitor template 102 described above. For example, the monitor template can be embedded within code of a software service and/or include a plurality of schema (e.g., schema 114, 116, 118), such that each schema includes a tag parameter (e.g., tag parameter 120, 124, 128) and an index parameter (122, 126, 130). Further, in certain embodiments, the monitor template can include a monitor module 132 and/or an event handler module 152.

According to certain embodiments, the method 500 includes detecting, by the monitor, whether an aberration has occurred (block 504). To detect whether an aberration has occurred, the generated monitor detects whether an endpoint associated with a tag parameter instance included in the generated monitor has exceeded a threshold associated with an index parameter instance included in the generated monitor. In response, the generated monitor sends a signal to, for example, an event handler. In aspects, the method 500 includes determining an event corresponding to the aberration (block 506). In some aspects, the method 500 determines an event corresponding to the aberration by accessing a lookup table. The lookup table associates an aberration of an endpoint detected by a generated monitor with an event. In certain aspects, the event handler determines an event corresponding to the aberration. In aspects, the method 500 further includes performing the event in response to the aberration (block 508). In certain aspects, the event handler performs the event. In examples, performing the event can include, but is not limited to, sending an alert, sending a message (e.g., a Slack message), and/or initiating a help ticket (e.g., Jira ticket). In certain aspects, blocks 502-508 can be performed for a plurality of aberrations (e.g., a first aberration, a second aberration, etc.) using respective generated monitors for respective endpoints and/or respective software services.

In at least some embodiments, the method 500 includes changing an event (e.g., a first event or a second event) to a different event in response to user-provided code (block 510). That is, for example, a user may generate a user-defined event to be performed when an event is detected. Once the event is changed to a different event by the user, the method 500 includes performing the different event in response to the aberration (block 512).

Figure 6:
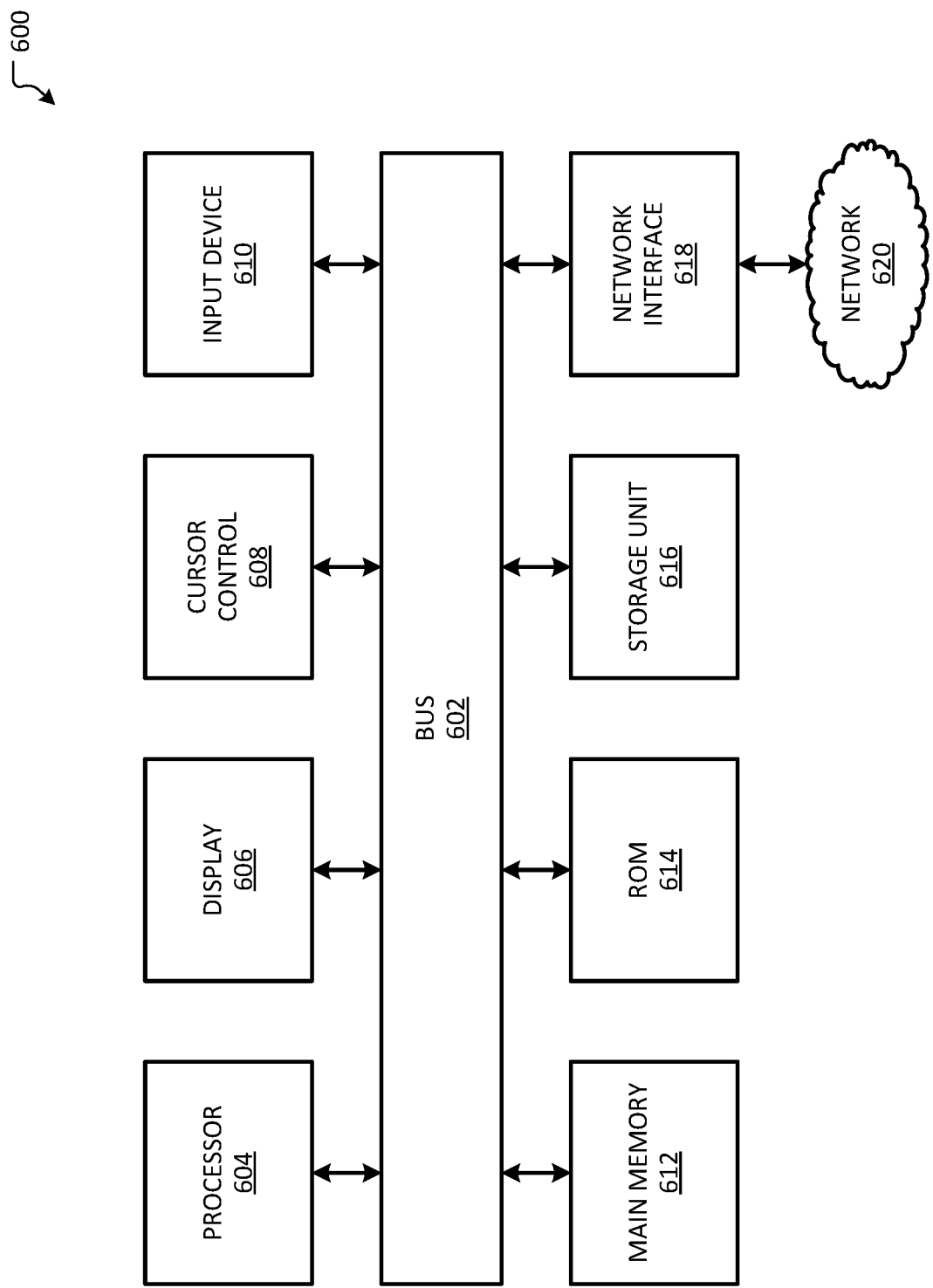
FIG. 6 is a simplified diagram showing a computing system for implementing a system for generating a monitor and/or monitoring at least one software service in accordance with at least one example set forth in the disclosure.

FIG. 6 is a simplified diagram showing a computing system for implementing a system for generating a monitor and/or monitoring at least one software service in accordance with at least one example set forth in the disclosure. This diagram is merely an example, which should not unduly limit the scope of the claims. One of ordinary skill in the art would recognize many variations, alternatives, and modifications.

The computing system 600 includes a bus 602 or other communication mechanism for communicating information, a processor 604, a display 606, a cursor control component 608, an input device 610, a main memory 612, a read only memory (ROM) 614, a storage unit 616, and a network interface 618. In some embodiments, some or all processes (e.g., steps) of the methods 200, 300, 400, and/or 500 are performed by the computing system 600. In some examples, the bus 602 is coupled to the processor 604, the display 606, the cursor control component 608, the input device 610, the main memory 612, the read only memory (ROM) 614, the storage unit 616, and/or the network interface 618. In certain examples, the network interface is coupled to a network 620. For example, the processor 604 includes one or more general purpose microprocessors. In some examples, the main memory 612 (e.g., random access memory (RAM), cache and/or other dynamic storage devices) is configured to store information and instructions to be executed by the processor 604. In certain examples, the main memory 612 is configured to store temporary variables or other intermediate information during execution of instructions to be executed by processor 604. For examples, the instructions, when stored in the storage unit 616 accessible to processor 604, render the computing system 600 into a special-purpose machine that is customized to perform the operations specified in the instructions. In some examples, the ROM 614 is configured to store static information and instructions for the processor 604. In certain examples, the storage unit 616 (e.g., a magnetic disk, optical disk, or flash drive) is configured to store information and instructions.

In some embodiments, the display 606 (e.g., a cathode ray tube (CRT), an LCD display, or a touch screen) is configured to display information to a user of the computing system 600. In some examples, the input device 610 (e.g., alphanumeric and other keys) is configured to communicate information and commands to the processor 604. For example, the cursor control component 608 (e.g., a mouse, a trackball, or cursor direction keys) is configured to communicate additional information and commands (e.g., to control cursor movements on the display 606) to the processor 604.

According to some embodiments, a computer-implemented method for generating a monitor for at least one software service from a monitor template, includes: providing a monitor template; determining one or more endpoints included in code for a first software service of the at least one software service; and generating a first monitor for the first software service code using the monitor template based at least upon a first endpoint of the one or more endpoints included in the first software service code. For example, the method is implemented according to at least FIG. 1, FIG. 2, FIG. 3, FIG. 4, FIG. 5, and/or FIG. 6.

In certain examples, the monitor template includes a plurality of schema, wherein each schema includes a tag parameter and an index parameter.

In some examples, generating the first monitor using the monitor template includes: resolving a first tag parameter associated with a first schema of the plurality of schema to a first tag parameter instance associated with the first endpoint; determining a first index parameter instance associated with the first tag parameter instance; and realizing the first index parameter to the first tag parameter instance associated with the first endpoint.

In certain examples, the method further includes: determining one or more endpoints included in code for a second software service; and generating a second monitor for the second software service code using the monitor template based at least upon a second endpoint of the one or more endpoints included in the second software service code.

In some examples, the tag parameter is a string tuple.

In certain examples, the index parameter is a double value.

In some examples, the monitor template is embedded within code of the software service.

In certain examples, the method further includes: monitoring the first software service using the first monitor generated by the monitor template; detecting, by the first monitor, whether a first aberration of the first software service has occurred; determining a first event corresponding to the first aberration; and performing the first event in response to the occurrence of the first aberration.

In certain examples, monitoring the first software service using the first monitor comprises using the first resolved tag parameter and the first realized index parameter of the first monitor to detect the first aberration.

In some examples, the first aberration has occurred when the first realized index parameter exceeds a threshold.

In certain examples, the method further includes: monitoring the second software service using the second monitor generated by the monitor template; detecting, by the second monitor, whether a second aberration of the second software service has occurred; determining a second event corresponding to the second aberration, wherein the first event is different than the second event; and performing the second event in response to the occurrence of the second aberration.

In some examples, the first event is at least one of: sending an alert, sending a message, and initiating a help ticket.

In certain examples, the method further includes changing the first event to a different event in response to user provided code; and performing the different event in response to the occurrence of the first aberration.

According to some embodiments, a computing system for generating a monitor for at least one software service from a monitor template, includes: at least one processor; and memory storing instructions that, when executed by the at least one processor, causes the system to perform a set of operations, the set of operations including: providing a monitor template; determining one or more endpoints included in code for a first software service; and generating a first monitor for the first software service code using the monitor template based at least upon a first endpoint of the one or more endpoints included in the first software service code. For example, the computing system is implemented according to at least FIG. 1, FIG. 2, FIG. 3, FIG. 4, FIG. 5, and/or FIG. 6.

In certain examples, the monitor template comprises a plurality of schema, wherein each schema includes a tag parameter and an index parameter and wherein generating the first monitor using the monitor template includes: resolving a first tag parameter associated with a first schema of the plurality of schema to a tag parameter instance associated with the first endpoint; determining a first index parameter associated with the first tag parameter; and realizing the first index parameter to a first tag parameter instance associated with the first endpoint.

In some examples, the memory further includes instructions that, when executed by the at least one processor, causes the system to perform a set of operations, the set of operations including: determining one or more endpoints included in code for a second software service; and generating a second monitor for the second software service code using the monitor template based at least upon a second endpoint of the one or more endpoints included in the second software service code.

In certain examples, the tag parameter is a string tuple.

In some examples, the index parameter is a double value.

In certain examples, the memory further includes instructions that, when executed by the at least one processor, causes the system to perform a set of operations, the set of operations including: monitoring the first software service using the first monitor generated by the monitor template; detecting, by the first monitor, whether a first aberration of the first software service has occurred; determining a first event corresponding to the first aberration; and performing the first event in response to the occurrence of the first aberration.

According to some embodiments, a computer-implemented method for generating a monitor for at least one software service from a monitor template, includes: providing a monitor template comprising a schema for a tag parameter and an index parameter; determining one or more endpoints included in code for a first software service of the at least one software service; resolving the tag parameter to a tag parameter instance associated with the software service; determining an index parameter instance associated with the tag parameter instance; and realizing the index parameter to the tag parameter instance. For example, the method is implemented according to at least FIG. 1, FIG. 2, FIG. 3, FIG. 4, FIG. 5, and/or FIG. 6.

According to some embodiments, a computer-implemented method for monitoring at least one software service using a monitor template, includes: monitoring a first software service of the at least one software service using a first monitor generated by the monitor template, wherein monitoring the first software service using the first monitor comprises using a first resolved tag parameter and a first realized index parameter of the first monitor; detecting, by the first monitor, whether a first aberration of the first software service has occurred; determining a first event corresponding to the first aberration; and performing the first event in response to the occurrence of the first aberration. For example, the method is implemented according to at least FIG. 1, FIG. 2, FIG. 3, FIG. 4, FIG. 5, and/or FIG. 6.

In certain examples, the first aberration has occurred when the first realized index parameter exceeds a threshold.

In some examples, the method further includes monitoring a second software service using a second monitor generated by the monitor template, wherein monitoring the second software service using the second monitor comprises using a second resolved tag parameter and a second realized index parameter of the second monitor; detecting, by the second monitor, whether a second aberration of the second software service has occurred; determining a second event corresponding to the second aberration; and performing the second event in response to the occurrence of the second aberration.

In certain examples, the first event is at least one of: sending an alert, sending a message, and initiating a help ticket.

In some examples, the method further includes changing the first event to a different event in response to user provided code; and performing the different event in response to the occurrence of the first aberration.

In certain examples, the method further includes generating the first monitor for the first software service.

In some examples, wherein generating the first monitor for the first software service includes: determining one or more endpoints included in code for the first software service; and generating the first monitor for the first software service code using the monitor template based at least upon a first endpoint of the one or more endpoints included in the first software service code.

In certain examples, the monitor template comprises a plurality of schema and wherein generating the first monitor using the monitor template includes: resolving a first tag parameter of a first schema of the plurality of schema to a first tag parameter instance associated with the first service to generate the first resolved tag parameter; determining a first index parameter instance associated with the first tag parameter instance; and realizing a first index parameter associated with the first tag parameter to the first tag parameter instance to generate the first realized index parameter.

According to certain embodiments, a computing system for monitoring at least one software service using a monitor template, includes: at least one processor; and memory storing instructions that, when executed by the at least one processor, causes the system to perform a set of operations, the set of operations including: monitoring a first software service of the at least one software service using a first monitor generated by the monitor template, wherein monitoring the first software service using the first monitor comprises using a first resolved tag parameter and a first realized index parameter of the first monitor; detecting, by the first monitor, whether a first aberration of the first software service has occurred; determining a first event corresponding to the first aberration; and performing the first event in response to the occurrence of the first aberration. For example, the computing system is implemented according to at least FIG. 1, FIG. 2, FIG. 3, FIG. 4, FIG. 5, and/or FIG. 6.

In certain examples, the first aberration has occurred when the first realized index parameter exceeds a threshold.

In some examples, the memory further includes instructions that, when executed by the at least one processor, causes the system to perform a set of operations, the set of operations including: monitoring a second software service using a second monitor generated by the monitor template, wherein monitoring the second software service using the second monitor comprises using a second resolved tag parameter and a second realized index parameter of the second monitor; detecting, by the second monitor, whether a second aberration of the second software service has occurred; determining a second event corresponding to the second aberration; and performing the second event in response to the occurrence of the second aberration.

In certain examples, the first event is at least one of: sending an alert, sending a message, and initiating a help ticket.

In some examples, the memory further includes instructions that, when executed by the at least one processor, causes the system to perform a set of operations, the set of operations including: changing the first event to a different event in response to user provided code; and performing the different event in response to the occurrence of the first aberration.

In certain examples, further including instructions that, when executed by the at least one processor, causes the system to perform a set of operations, the set of operations including generating the first monitor for the first software service.

In some examples, wherein generating the first monitor for the first software service includes: determining one or more endpoints included in code for the first software service; and generating the first monitor for the first software service code using the monitor template based at least upon a first endpoint of the one or more endpoints included in the first software service code.

In certain examples, wherein the monitor template comprises a plurality of schema and wherein generating the first monitor using the monitor template comprises: resolving a first tag parameter of a first schema of the plurality of schema to a first tag parameter instance associated with the first service to generate the first resolved tag parameter; determining a first index parameter instance associated with the first tag parameter instance; and realizing a first index parameter associated with the first tag parameter to the first tag parameter instance to generate the first realized index parameter.

According to certain examples, a computer-implemented method for monitoring at least one software service using a monitor template, the method including: generating a first monitor using the monitor template for a first software service; monitoring the first software service using a first monitor generated by the monitor template, wherein monitoring the first software service using the first monitor comprises using a first resolved tag parameter and a first realized index parameter of the first monitor; detecting, by the first monitor, whether a first aberration of the first software service has occurred; determining a first event corresponding to the first aberration; and performing the first event in response to the occurrence of the first aberration. For example, the method is implemented according to at least FIG. 1, FIG. 2, FIG. 3, FIG. 4, FIG. 5, and/or FIG. 6

In certain examples, wherein generating the first monitor for the first software service includes: determining one or more endpoints included in code for the first software service; and generating the first monitor for the first software service code using the monitor template based at least upon a first endpoint of the one or more endpoints included in the first software service code.

In some examples, wherein the monitor template comprises a plurality of schema and wherein generating the first monitor using the monitor template includes: resolving a first tag parameter of a first schema of the plurality of schema to a first tag parameter instance associated with the first service to generate the first resolved tag parameter; determining a first index parameter instance associated with the first tag parameter instance; and realizing a first index parameter associated with the first tag parameter to the first tag parameter instance to generate the first realized index parameter.

In certain examples, the first aberration has occurred when the first realized index parameter exceeds a threshold.

According to some embodiments, a non-transitory computer-readable storage medium storing processor executable instructions, that when executed cause one or more processors to: provide a monitor template; determine one or more endpoints included in code for a first software service of the at least one software service; and generate a first monitor for the first software service code using the monitor template based at least upon a first endpoint of the one or more endpoints included in the first software service code. In certain examples, the non-transitory computer-readable storage medium is implemented according to at least FIG. 1, FIG. 2, FIG. 3, FIG. 4, FIG. 5, and/or FIG. 6.

According to some embodiments, a non-transitory computer-readable storage medium storing processor executable instructions, that when executed cause one or more processors to: provide a monitor template comprising a schema for a tag parameter and an index parameter; determine one or more endpoints included in code for a first software service of the at least one software service; resolve the tag parameter to a tag parameter instance associated with the software service; determine an index parameter instance associated with the tag parameter instance; and realize the index parameter to the tag parameter instance. In certain examples, the non-transitory computer-readable storage medium is implemented according to at least FIG. 1, FIG. 2, FIG. 3, FIG. 4, FIG. 5, and/or FIG. 6.

According to some embodiments, a non-transitory computer-readable storage medium storing processor executable instructions, that when executed cause one or more processors to: monitor a first software service of the at least one software service using a first monitor generated by the monitor template, wherein monitoring the first software service using the first monitor comprises using a first resolved tag parameter and a first realized index parameter of the first monitor; detect, by the first monitor, whether a first aberration of the first software service has occurred; determine a first event corresponding to the first aberration; and perform the first event in response to the occurrence of the first aberration. In certain examples, the non-transitory computer-readable storage medium is implemented according to at least FIG. 1, FIG. 2, FIG. 3, FIG. 4, FIG. 5, and/or FIG. 6.

According to some embodiments, a non-transitory computer-readable storage medium storing processor executable instructions, that when executed cause one or more processors to: generate a first monitor using the monitor template for a first software service; monitor the first software service using a first monitor generated by the monitor template, wherein monitoring the first software service using the first monitor comprises using a first resolved tag parameter and a first realized index parameter of the first monitor; detect, by the first monitor, whether a first aberration of the first software service has occurred; determine a first event corresponding to the first aberration; and perform the first event in response to the occurrence of the first aberration. In certain examples, the non-transitory computer-readable storage medium is implemented according to at least FIG. 1, FIG. 2, FIG. 3, FIG. 4, FIG. 5, and/or FIG. 6.

What is claimed is:

1. A computer-implemented method for generating a monitor for at least one software service from a monitor template, the method comprising:
   providing the monitor template;
   determining one or more endpoints included in code for a first software service of the at least one software service;
   generating a first monitor for the first software service code using the monitor template based at least upon a first endpoint of the one or more endpoints included in the first software service code;
   monitoring the first software service using the first monitor generated by the monitor template;
   detecting, by the first monitor, whether a first aberration of the first software service has occurred;
   determining a first event corresponding to the first aberration; and performing the first event in response to the occurrence of the first aberration.

2. The computer-implemented method of claim 1, wherein the monitor template comprises a plurality of schema, wherein each schema includes a tag parameter and an index parameter.

3. The computer-implemented method of claim 2, wherein generating the first monitor using the monitor template comprises:
resolving a first tag parameter associated with a first schema of the plurality of schema to a first tag parameter instance associated with the first endpoint;
determining a first index parameter instance associated with the first tag parameter instance; and
realizing the first index parameter to the first tag parameter instance associated with the first endpoint.

4. The computer-implemented method of claim 3, wherein monitoring the first software service using the first monitor comprises using the first resolved tag parameter and the first realized index parameter of the first monitor to detect the first aberration.

5. The computer-implemented method of claim 4, wherein the first aberration has occurred when the first realized index parameter exceeds a threshold.

6. The computer-implemented method of claim 2, wherein the tag parameter is a string tuple.

7. The computer-implemented method of claim 2, wherein the index parameter is a double value.

8. The computer-implemented method of claim 1, further comprising:
determining one or more endpoints included in code for a second software service; and
generating a second monitor for the second software service code using the monitor template based at least upon a second endpoint of the one or more endpoints included in the second software service code.

9. The computer-implemented method of claim 8, further comprising:
monitoring the second software service using the second monitor generated by the monitor template;
detecting, by the second monitor, whether a second aberration of the second software service has occurred;
determining a second event corresponding to the second aberration, wherein the first event is different than the second event; and
performing the second event in response to the occurrence of the second aberration.

10. The computer-implemented method of claim 1, wherein the monitor template is embedded within code of the software service.

11. The computer-implemented method of claim 1, wherein the first event is at least one of: sending an alert, sending a message, and initiating a help ticket.

12. The computer-implemented method of claim 1, further comprising: changing the first event to a different event in response to user provided code; and performing the different event in response to the occurrence of the first aberration.

13. A computing system for generating a monitor for at least one software service from a monitor template, the computing system comprising:
at least one processor; and
memory storing instructions that, when executed by the at least one processor, causes the system to perform a set of operations, the set of operations comprising:
providing the monitor template;
determining one or more endpoints included in code for a first software service;
generating a first monitor for the first software service code using the monitor template based at least upon a first endpoint of the one or more endpoints included in the first software service code;
monitoring the first software service using the first monitor generated by the monitor template;
detecting, by the first monitor, whether a first aberration of the first software service has occurred;
determining a first event corresponding to the first aberration; and
performing the first event in response to the occurrence of the first aberration.

14. The computing system of claim 13, wherein the monitor template comprises a plurality of schema, wherein each schema includes a tag parameter and an index parameter and wherein generating the first monitor using the monitor template comprises:
resolving a first tag parameter associated with a first schema of the plurality of schema to a tag parameter instance associated with the first endpoint;
determining a first index parameter associated with the first tag parameter; and
realizing the first index parameter to a first tag parameter instance associated with the first endpoint.

15. The computing system of claim 13, the memory further comprises instructions that, when executed by the at least one processor, causes the system to perform a set of operations, the set of operations comprising:
determining one or more endpoints included in code for a second software service; and
generating a second monitor for the second software service code using the monitor template based at least upon a second endpoint of the one or more endpoints included in the second software service code.

16. The computing system of claim 13, wherein the tag parameter is a string tuple.

17. The computing system of claim 13, wherein the index parameter is a double value.

18. A computer-implemented method for monitoring at least one software service using a monitor template, the method comprising:
monitoring a first software service of the at least one software service using a first monitor generated by the monitor template, wherein monitoring the first software service using the first monitor comprises using a first resolved tag parameter and a first realized index parameter of the first monitor;
detecting, by the first monitor, whether a first aberration of the first software service has occurred;
determining a first event corresponding to the first aberration;
performing the first event in response to the occurrence of the first aberration;
monitoring a second software service using a second monitor generated by the monitor template, wherein monitoring the second software service using the second monitor comprises using a second resolved tag parameter and a second realized index parameter of the second monitor;
detecting, by the second monitor, whether a second aberration of the second software service has occurred;
determining a second event corresponding to the second aberration; and
performing the second event in response to the occurrence of the second aberration.

19. The computer-implemented method of claim 18, wherein the first aberration has occurred when the first realized index parameter exceeds a threshold.

20. The computer-implemented method of claim 18, wherein the first event is at least one of: sending an alert, sending a message, and initiating a help ticket.

21. The computer-implemented method of claim 18, further comprising:
changing the first event to a different event in response to user provided code; and
performing the different event in response to the occurrence of the first aberration.

22. The computer-implemented method of claim 18, further comprising generating the first monitor for the first software service.

23. The computer-implemented method of claim 22, wherein generating the first monitor for the first software service comprises:
determining one or more endpoints included in code for the first software service; and
generating the first monitor for the first software service code using the monitor template based at least upon a first endpoint of the one or more endpoints included in the first software service code.

24. The computer-implemented method of claim 23, wherein the monitor template comprises a plurality of schema and wherein generating the first monitor using the monitor template comprises:
resolving a first tag parameter of a first schema of the plurality of schema to a first tag parameter instance associated with the first service to generate the first resolved tag parameter;
determining a first index parameter instance associated with the first tag parameter instance; and
realizing a first index parameter associated with the first tag parameter to the first tag parameter instance to generate the first realized index parameter.

25. A computing system for monitoring at least one software service using a monitor template, comprising:
at least one processor; and
memory storing instructions that, when executed by the at least one processor, causes the system to perform a set of operations, the set of operations comprising:
monitoring a first software service of the at least one software service using a first monitor generated by the monitor template, wherein monitoring the first software service using the first monitor comprises using a first resolved tag parameter and a first realized index parameter of the first monitor;
detecting, by the first monitor, whether a first aberration of the first software service has occurred;
determining a first event corresponding to the first aberration; and
performing the first event in response to the occurrence of the first aberration;
monitoring a second software service using a second monitor generated by the monitor template, wherein monitoring the second software service using the second monitor comprises using a second resolved tag parameter and a second realized index parameter of the second monitor;
detecting, by the second monitor, whether a second aberration of the second software service has occurred;
determining a second event corresponding to the second aberration; and
performing the second event in response to the occurrence of the second aberration.

26. The computing system of claim 25, wherein the first aberration has occurred when the first realized index parameter exceeds a threshold.

27. The computing system of claim 25, wherein the first event is at least one of:
sending an alert, sending a message, and initiating a help ticket.

28. The computing system of claim 25, further comprising instructions that, when executed by the at least one processor, causes the system to perform a set of operations, the set of operations comprising:
changing the first event to a different event in response to user provided code; and
performing the different event in response to the occurrence of the first aberration.

29. The computing system of claim 25, further comprising instructions that, when executed by the at least one processor, causes the system to perform a set of operations, the set of operations comprising generating the first monitor for the first software service.

30. The computing system of claim 29, wherein generating the first monitor for the first software service comprises:
determining one or more endpoints included in code for the first software service; and
generating the first monitor for the first software service code using the monitor template based at least upon a first endpoint of the one or more endpoints included in the first software service code.

31. The computing system of claim 30, wherein the monitor template comprises a plurality of schema and wherein generating the first monitor using the monitor template comprises:
resolving a first tag parameter of a first schema of the plurality of schema to a first tag parameter instance associated with the first service to generate the first resolved tag parameter;
determining a first index parameter instance associated with the first tag parameter instance; and
realizing a first index parameter associated with the first tag parameter to the first tag parameter instance to generate the first realized index parameter.

32. A computer-implemented method for monitoring at least one software service using a monitor template, the method comprising:
generating a first monitor using the monitor template for a first software service;
monitoring the first software service using a first monitor generated by the monitor template, wherein monitoring the first software service using the first monitor comprises using a first resolved tag parameter and a first realized index parameter of the first monitor;
detecting, by the first monitor, whether a first aberration of the first software service has occurred;
determining a first event corresponding to the first aberration; and
changing the first event to a different event in response to user provided code; and
performing the different event in response to the occurrence of the first aberration.

33. The computer-implemented method of claim 32, wherein generating the first monitor for the first software service comprises:
determining one or more endpoints included in code for the first software service; and generating the first monitor for the first software service code using the monitor template based at least upon a first endpoint of the one or more endpoints included in the first software service code.

34. The computer-implemented method of claim 32, wherein the monitor template comprises a plurality of schema and wherein generating the first monitor using the monitor template comprises:
   resolving a first tag parameter of a first schema of the plurality of schema to a first tag parameter instance associated with the first service to generate the first resolved tag parameter;
   determining a first index parameter instance associated with the first tag parameter instance; and
   realizing a first index parameter associated with the first tag parameter to the first tag parameter instance to generate the first realized index parameter.

35. The computer-implemented method of claim 32, wherein the first aberration has occurred when the first realized index parameter exceeds a threshold.

36. A computing system for monitoring at least one software service using a monitor template, comprising:
   at least one processor; and
   memory storing instructions that, when executed by the at least one processor, causes the system to perform a set of operations, the set of operations comprising:
      monitoring a first software service of the at least one software service using a first monitor generated by the monitor template, wherein monitoring the first software service using the first monitor comprises using a first resolved tag parameter and a first realized index parameter of the first monitor;
      detecting, by the first monitor, whether a first aberration of the first software service has occurred;
      determining a first event corresponding to the first aberration;
      changing the first event to a different event in response to user provided code; and
      performing the different event in response to the occurrence of the first aberration.

37. The computing system of claim 36, wherein the first aberration has occurred when the first realized index parameter exceeds a threshold.

38. The computing system of claim 36, wherein the first event is at least one of:
   sending an alert, sending a message, and initiating a help ticket.

39. The computing system of claim 36, further comprising generating the first monitor for the first software service, wherein generating the first monitor for the first software service comprises:
   determining one or more endpoints included in code for the first software service; and
   generating the first monitor for the first software service code using the monitor template based at least upon a first endpoint of the one or more endpoints included in the first software service code.

40. The computing system of claim 39, wherein the monitor template comprises a plurality of schema and wherein generating the first monitor using the monitor template comprises:
   resolving a first tag parameter of a first schema of the plurality of schema to a first tag parameter instance associated with the first service to generate the first resolved tag parameter;
   determining a first index parameter instance associated with the first tag parameter instance; and
   realizing a first index parameter associated with the first tag parameter to the first index parameter instance to generate the first realized index parameter.

* * * * *